April 15, 1969   I. BERMAN ET AL   3,438,114
CREEP AUTOFRETTAGE
Filed Nov. 25, 1966
Fig. 1
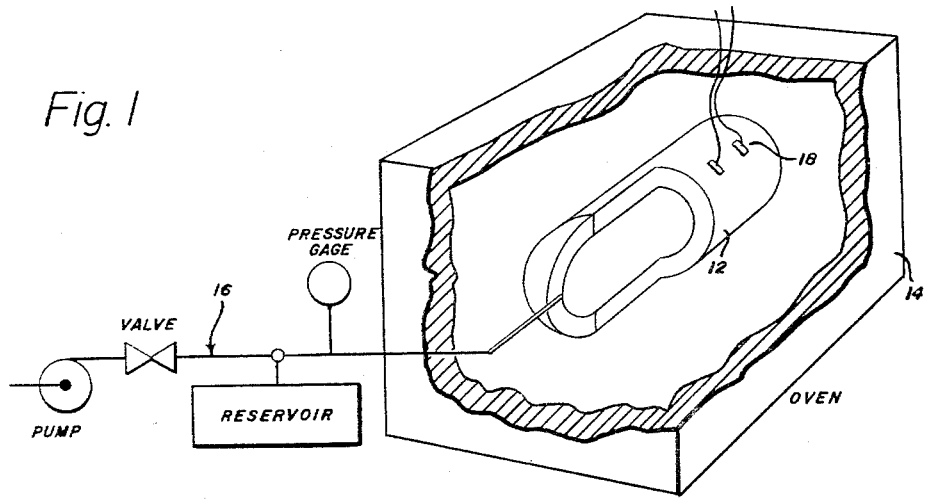
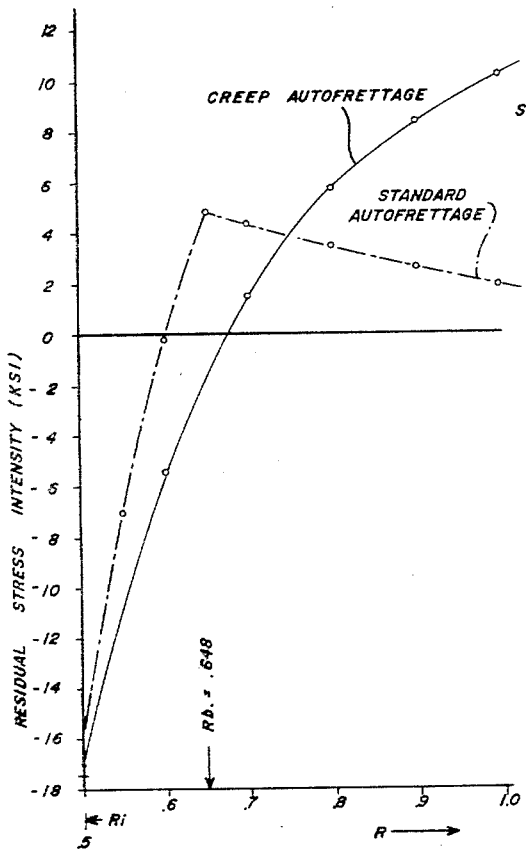
Fig. 2
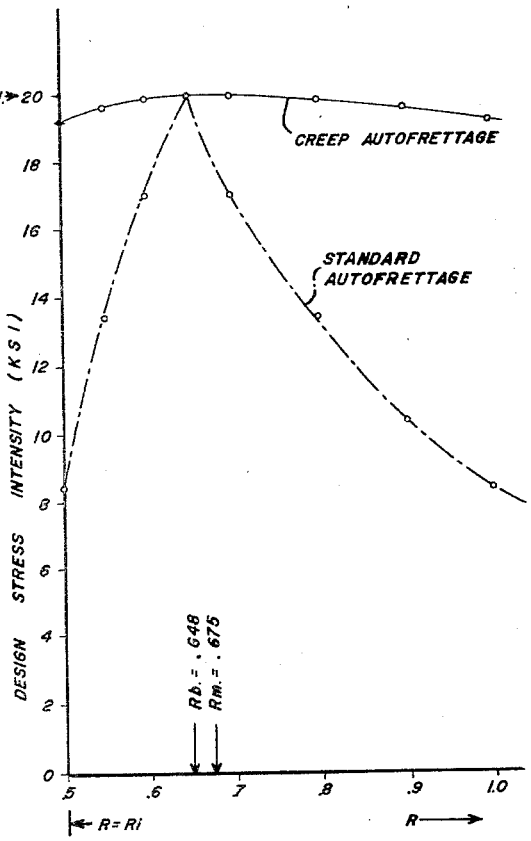
Fig. 3
INVENTOR.
IRWIN BERMAN
DAVID H. PAI
Richard H. Thomas
ATTORNEY United States Patent Office 3,438,114
Patented Apr. 15, 1969

3,438,114
CREEP AUTOFRETTAGE
Irwin Berman, Bronx, N.Y., and David H. Pai, Metuchen, N.J., assignors to Foster Wheeler Corporation, Livingston, N.J., a corporation of New York
Filed Nov. 25, 1966, Ser. No. 596,864
Int. Cl. B23p 11/02; B21d 3/00
U.S. Cl. 29—404      5 Claims The present invention relates to the fabrication of pressure vessels, and in particular to improvements in the autofrettage of pressure vessels.

For purposes of this application, the term "stress intensity" is defined as the maximum difference of the principal stresses, longitudinal, circumferential and radial, at a point in a vessel wall (ASME Boiler and Pressure Vessel Code, section III, page 13). It is equal to twice the maximum vessel shear stress at that point. The term "autofrettage stress intensity" is defined as the stress intensity which exists at any point in the thickness of the vessel at fabrication autofrettage pressure and temperature. "Residual stress intensity" relates to the stress intensity existing in the vessel wall following fabrication and release of fabrication pressure and temperature. "Design stress intensity" concerns the operating stress intensity in the vessel wall at design operating pressure and temperature (ambient or otherwise).

Also, for the purposes of this application, the terms "elastic flow" and "plastic flow" will be used indicating the nature of the flow of metal under stress. The molecular movement in metals is elastic up to the point when slipping occurs in the grains of the materials, at which point, the flow is plastic.

The term "creep" is definable as the gradual flow or deformation of metal under sustained loading and temperature. Most of the flow is nonrecoverable on release of load. "Secondary creep" in a plot of strain vs. time is that period in which the creep rate is constant.

Autofrettage is a well-known process and includes the procedure of expanding an inner layer or stratum of metal (in a multi-layer or thick walled single layer vessel) beyond its elastic limit so that a permanent set or deformation of the inner layer or stratum takes place; i.e., plastic flow in the stratum occurs. Following release of the expanding pressure, the inner layer or stratum is under circumferential compression, restrained by the outer layer or stratum under circumferential tension. Broadly, autofrettage can be defined as the application of one stress intensity distribution to the vessel wall (to the point of overloading and plastic flow of metal) and removal of another stress intensity distribution with release of fabrication pressure. The release allows only an elastic or resilient contraction of the vessel, leaving a residual stress intensity distribution in the vessel wall.

Autofrettage may be very beneficial in the case of thick walled cylinders subjected to large internal pressures because of the large gradient of stress experienced through the thickness of the vessel wall. As will be shown, it provides a means for more efficient use of outer layers or strata of the vessel wall which normally would be understressed when subjected to design pressures.

As further background for the present invention, one of the earliest uses for autofrettage was in the fabrication of gun barrels, although the purpose in autofretting was to obtain dimensional stability of the gun barrel rather than added strength. The gun barrel wall was stressed in fabrication beyond its elastic limit so that there was a plastic flow of metal in essentially the entire thickness of the barrel, establishing a residual stress intensity pattern through the gun barrel wall.

The basic explanation for this is simple. During initial pressurizing, as the inner stratum of the gun barrel wall becomes plastic (i.e. beyond the elastic limit), the point of maximum stress intensity in the barrel is immediately outside of or beyond this stratum. As the pressure is increased, the point of maximum stress intensity moves outwardly in the barrel until, just prior to bursting, the point is located near the outside surface of the barrel, with the stress intensity being then least at the inside surface of the barrel.

On release of the pressure within the barrel, there is a uniform shrinking of the barrel as a result of its elasticity, except that a permanent deformation or set has been established, and the barrel wall is provided with a residual stress intensity pattern, throughout its thickness, which as with the stress intensity pattern established prior to release of internal pressure, has a maximum stress intensity near the outside of the barrel wall.

Design pressure, resulting from the explosion within the barrel, creates a stress intensity pattern the maximum intensity of which is near the inside wall of the barrel. These two stress intensity patterns combined create a stress intensity which achieves dimensional stability in the gun barrel.

With respect to the autofrettage of pressure vessels, the autofrettage conventionally is carried out to the extent that only the inner one third thickness of the vessel is expanded to the point of plastic flow, creating a residual stress pattern wherein the maximum stress intensity is about a third of the way through the vessel wall. It has been determined in practice and may be verified analytically that plastic flow to about one third of the thickness creates the best residual stress distribution for subsequent design pressurization that may be obtained by standard autofrettage. At design pressure, the stress vs. vessel thickness curve, will still have a configuration with a large portion of the vessel thickness near the outside wall highly understressed, thereby rendering the vessel relatively inefficient in terms of metal thickness required to retain a particular design pressure. In addition, standard autofrettage today for pressure vessels requires fabrication pressures which are high even compared to the burst pressure.

As an alternative method for obtaining a more uniform residual stress intensity pattern in the thickness of a vessel, it is known to shrink fit one vessel layer within another. There are many ways of doing this, but each method relies on the creation of an interference fit between the outside diameter of one layer and the inside diameter of the next layer in contact. These methods require machining to extremely close tolerances, and for cylinders of large length, especially thin cylinders the tolerance problem is unsolvable. If heating is used for assembly, the heating may be detrimental to the materials involved if a large overlap is required.

Autofrettage has been used with shrink fit, and in theory, could provide a reasonably uniform stress intensity distribution level. In practice, good results for high pressure vessels have been difficult to achieve.

The present invention resides in the discovery of a unique series of relationships and sequence of steps whereby the above disadvantages are overcome.

Accordingly, it is an object of the present invention to provide an autofrettage method by which a significant increase in allowable design pressure of a pressure vessel is obtained with a limited autofrettage pressure. As a corollary, it is an object of the invention to provide a method for autofrettage of a vessel in which a lower autofrettage pressure can be used.

It is a further object to increase material utilization or efficiency in a thick-walled or multi-layer cylindrical pressure vessel.

In accordance with the invention, creep autofrettage is the application of a predetermined load ($p_1$) which is a function of vessel design pressure ($p_2$) in accordance with the equation $$p_1 = \frac{n}{n-1} p_2 \quad (1)$$

$n$ being the vessel creep exponent. The temperature and time parameters for fabrication are those which will establish secondary creep in the vessel wall. It was discovered that the pressure ($p_1$) applied at a sufficient temperature and for a sufficient time to obtain secondary creep created, on release of load, a residual stress intensity distribution favorable for subsequent design load. In essence, it created a stress intensity pattern which at design load established a uniform stress intensity through the vessel wall.

The design pressure ($p_2$) is a function of material design stress intensity ($S_d$), and vessel thickness ($R_i$ equals ratio of inner radius to outer radius) in accordance with the equation $$p_2 = \frac{1}{2} S_d (n)^{\frac{n}{n-1}} (R_i^{-2} - 1)^{\frac{-1}{n-1}} \left( R_i^{\left(\frac{-2}{n}\right)} - 1 \right)^{\frac{n}{n-1}} \quad (2)$$

vessel stress intensity being that established at a uniform level through creep autofrettage at fabrication pressure ($p_1$).

Two major advantages of creep autofrettage as compared to the usual autofrettage by high pressure at ambient temperature will become evident. For the pressurized thick-walled cylinder, the advantages are:

(1) The residual stress distribution may be created by the use of a lower internal pressure than for the usual autofrettage. This may be very important in cylinder work since the closure for autofrettage pressures presents a formidable problem and by the usual autofrettage the pressure may be a very large percentage of the burst pressure.

(2) The residual stress pattern created by creep autofrettage may be made more favorable for the subsequent use of the vessel than that created by the usual autofrettage. Or, stated another way, for a particular pressure vessel if it was correctly creep autofrettaged, it may be subsequently loaded with a higher internal pressure than if it were autofrettaged by the usual means if both cases were designed by the same stress criterion.

The invention and advantages thereof will become apparent from the following description, with reference to the accompanying drawings, in which FIGURE 1 is a schematic partial section view of a system for creep autofrettage of a vessel in accordance with the invention;

FIGURE 2 is a graph showing the variation of residual stress intensity with radius for various systems; and FIGURE 3 is a graph showing the variation of design stress intensity with radius for various systems.

It has been mentioned that autofrettage is the application of an internal pressure sufficient to obtain plastic flow of at least a part of the metal of a vessel wall.

Creep has been defined as the gradual flow or deformation of metal under sustained loading and temperatures. Most of the flow is nonrecoverable on release of load.

There seems to be a number of important parameters in the creep of metals, for instance, temperature, time, creep recovery and load. In a plot of creep strain vs. time, it is well-known that creep passes first through a region of primary creep (with a high but decreasing creep rate), then a region of secondary (relatively constant) creep, and finally a region of tertiary creep where the creep rate increases to failure or rupture. When a load is applied there is an instantaneous elastic strain (and a possible plastic strain), and then at constant load, there is plastic strain through the three regions of creep.

FIG. 1 illustrates schematically a system by which autofrettage can be carried out with the application of the parameters of creep sufficient to obtain a steady state or secondary creep condition.

The vessel 12 to be autofrettaged is placed in an oven 14 and is subjected to a predetermined desired temperature, in the order of 750° F. to 1000° F. depending, however, on the metal being used. A suitable pump valve and reservoir arrangement 16 subjects the interior of the vessel to the predetermined creep autofrettage pressure. Strain gages 18 indicate when a steady state or secondary creep state (constant rate) is reached. The vessel 12 may be a solid thick-walled vessel, as shown, or a multi-layer vessel.

In operation, in the present invention, a specific temperature is chosen, from data or plotted curves which contain ample information on most metals, and creep autofrettage proceeds at a temperature and for a time sufficient to arrive at the stress distribution of steady state or secondary creep.

The criteria for vessel design pressure are limits on vessel stress intensities.

With the selection of the parameters temperature and time, an internal pressure is applied to the vessel calculated as follows $$p_2 = \frac{1}{2} S_d (n)^{\frac{n}{n-1}} (R_i^{-2} - 1)^{\frac{-1}{n-1}} \left( R_i^{\frac{-2}{n}} - 1 \right)^{\frac{n}{n-1}} \quad (2)$$

wherein:

$p_2$ = vessel design pressure
$S_d$ = material design stress intensity—obtained from ASME Boiler and Pressure Vessel Code and dependent on material used and conditions of operation
$n$ = creep exponent—determinable by test or from data for a particular material
$R_i$ = ratio of inner radius to outer radius It should be noted that this equation can be used to determine ratio of radii for a desired design pressure or vice versa; i.e. design pressure, given ratio of radii (or vessel dimensions). Usually the design pressure is specified, and vessel dimensions are then obtained.

Equation 1 then gives the autofrettage pressure which should be used $$p_2 = \frac{n-1}{n} p_1 \quad (1)$$

wherein $p_1$ is the autofrettage pressure.

The following example illustrates the above principles of the invention:

EXAMPLE I

A vessel is constructed of ASTM 201-Grade B steel having the following material specifications:

Y (yield strength) = 37,000 p.s.i.
$S_d$ (design stress intensity) = 20,000 p.s.i. (ASME Code)
$n$ (creep exponent) = 6 (approximate)

These values (except for $S_d$) were obtained from the ASTM Technical Publication No. 180, 1955, "Elevated Temperature Properties of Carbon Steel." A procedure to obtain "$n$" from creep data is given at the end of this example.

It is desired to select the proper cylinder size $R_i$ (ID/OD ratio) to contain a design pressure of $p_2$=15,000 p.s.i. using Equation 2 above 15,000 p.s.i. =

$$\frac{20,000 \text{ p.s.i.}}{2} (6)^{1.2} (R_i^{-2} - 1)^{-0.2} (R_i^{-.333} - 1)^{1.2}$$

By trial and error, it is found that $$R_i = ID/OD = 0.465$$

If it is required to have an ID of 10", the OD will be $$OD = ID/R_i = 10/.465 = 22.0''$$

From Equation 1, the autofrettage pressure $P_1$ is found to be $$p_1 = (n/n-1)p_2 = 1.2 p_2 = 18,000 \text{ p.s.i.}$$

A temperature of 840° F. (selected from the above

ASTM publication) allows creep, and accordingly, in accordance with the invention, fabrication is carried out at 18,000 p.s.i. and 850° F. for a period of time sufficient to obtain steady state or secondary creep. This latter condition is detected by the use of external strain gages or extensometers located to show creep at a variable and then constant rate.

The yield strength of the material can be interpolated from the data of the ASTM publication, and at the creep autofrettage temperature of 840° F., is 25,200 p.s.i. At creep autofrettage temperature, a lower limit of the short time burst pressure may be calculated as follows:

$$p_b = y \ln R_i^{-1} \qquad (3)$$

where:

$p_b$ = the short time burst pressure
$y$ = the creep autofrettage temperature yield point
ln = the natural logarithm The burst pressure in this example is at least 19,300 p.s.i. which will exceed fabrication pressure.

EXAMPLE II

A thick-walled cylinder has the ratio of radii $$ID/OD = R_i = 0.5$$

and is made of ASTM A–201 Grade B steel. $S_d = 20,000$ p.s.i. The creep exponent $(n) = 6$.

The design pressure $p_2$ is obtained from Equation 2 and equals 13,700 p.s.i. Autofrettage pressure $p_1$ is obtained from Equation 1 and equals 16,400 p.s.i., autofrettage temperature being 840° F. The burst pressure at 840° F. is over 17,000 p.s.i.

Following creep autofrettage at an elevated pressure in Examples I and II, the temperature is reduced to ambient and the internal pressure is reduced to zero, preferably in that order, to avoid inelastic affects and reverse yielding. The order of reduction in temperature and pressure causes the removal only of an elastic or elastic-plastic short time stress pattern.

It was stated that an objective of the invention was to obtain a residual stress intensity distribution in the cylinder wall which, on exposure of the vessel to design pressure, results in a substantially uniform stress intensity distribution through the vessel wall, and thereby, maximum utilization of the vessel material. Generally speaking, the residual stress intensity distribution will show a maximum stress intensity at the outside of the vessel with the stress intensity reducing to zero about half-way through the vessel wall, the inner strata or layers of the vessel wall being in compression. This is shown in FIG. 2 in the dashed line labeled "Creep Autofrettage."

The residual stress intensity distribution may be determined from the equation $$S_R = 2p_1 \left[ \frac{R^{-2/n}}{n(R_i^{-2/n} - 1)} - \frac{R^{-2}}{(R_i^{-2} - 1)} \right] \qquad (4)$$

wherein:

$S_R$ = the residual stress intensity at a selected radius in the wall of the cylinder
$n$ = creep exponent
$R_i$ = the ratio of inner radius to outer radius
$R$ = selected radius in the wall of the cylinder divided by the outer radius Looking more closely at FIG. 2, it can be seen that the residual stress from creep autofrettage [using Equation 4] reaches a maximum (in K s.i.) of about 10 at the outside of the vessel where R (the ratio of the radius in question divided by the outside radius of the vessel) equals one, and reduces rapidly until at the point where $R = R_i = 0.5$, the residual stress is about minus 17 K s.i. This can be compared with standard autofrettage (using the optimum autofrettage pressure in each case) where the residual stress intensity reaches a maximum of about 5 K s.i. at $R = R_b = .648$ decreasing to the outside of the vessel. $R_b$ can also be described as the boundary for elastic plastic flow, beyond which the movement is all elastic. Comparing the two curves, it is apparent that from creep autofrettage a much larger portion of the vessel is under compression with the tension being greatest at the outside of the vessel.

FIG. 3 now illustrates one of the advantages of the invention. On the application of permissible design pressure to the vessel, the stress intensity in the vessel wall follows the dashed line for the vessel which has been subjected to creep autofrettage, as compared to the partially dotted line for the standard autofrettaged vessel. The latter has a maximum stress intensity at the point $R_b = .648$ and a sharply reducing stress intensity from this point to the outside of the vessel. The vessel which has been subjected to creep autofrettage has a maximum stress intensity at the point $R_m = .675$, close to that for the standard autofrettaged vessel, but a fairly constant stress intensity throughout the vessel.

In other words, it is apparent that at its design pressure, the creep autofrettaged vessel will be more efficient in that every portion of the vessel is more or less equally utilized, whereas, in the standard autofrettaged vessel at its permissible design pressure, only a small portion of the vessel is fully utilized. This means that a creep autofrettaged vessel can retain a much greater design pressure (for a given thickness and material), or that for a given design pressure, the thicknesses involved will be substantially less.

This is shown in the following table, for the vessel discussed with reference to FIGS. 2 and 3.

TABLE I

| | $p_1$ autofrettage pressure (p.s.i.) | $p_2$ design pressure (p.s.i.) |
| --- | --- | --- |
| Creep autofrettage | 16,400 | 13,700 |
| Standard autofrettage | 20,300 | 9,600 |

The increase in allowable design pressure over a standard autofrettaged cylinder is 42.7%, with a strikingly reduced autofrettage pressure required for fabrication.

The discussion up to this point has dealt with creep autofrettage pressure, the primary parameter of interest. The time and temperature parameters used during fabrication have been mentioned, and are easily determinable. The time parameter is obtained simply by applying strain measurements to the vessel. It was mentioned that creep in a vessel wall is the plastic deformation caused by slip along crystallographic directions and flow of grain boundary material, with the creep passing through first a region of primary creep, then a region of secondary creep and finally a region of tertiary creep. The strain rates or curve slopes in a strain vs. time curve show a decreasing rate, then a constant rate and finally a sharply increasing rate, respectively, for these three regions. The region of secondary creep is thus easily determined in that the strain gages show a constant strain rate when this region is reached.

The creep rate (inches per inch per hour) increases with temperature and/or pressure and well-known curves for instance those of the above ASTM publication exist to show creep rate with pressure at various temperatures for a particular material. In accordance with the invention, a desired creep temperature within known temperature limits is selected depending on the pressure used and creep rate desired.

The important thing is that applicants have found that for a particular design pressure and/or vessel wall thickness (given a vessel material and selecting a creep temperature and time), a calculable creep autofrettage pressure will provide a uniform stress intensity distribution in the vessel wall.

*Estimating the creep exponent "n"*

Some sources give tabulated values of $n$. But by and large, the majority of the creep and stress rupture data are presented in such a form as to include one of the following types of curves:

(1) Stress vs. creep rate, usually on a logarithmic scale.
(2) Stress vs. time to rupture also usually on a logarithmic scale.

If a material during creep behaves according to the $n$th power law (steel, aluminum and many other structural materials are in this category):

$$\dot{\epsilon}=B\sigma^n \quad (4)$$

where:

$\dot{\epsilon}$ = second stage creep rate
$\sigma$ = uniaxial stress
$B$ and $n$ are material constants then $n$ becomes the slope of the creep rate vs. stress on a logarithmic plot.

Thus, in an actual curve of creep rate $\epsilon$ (percent/hr.) vs. stress $\sigma$ one may find the following numbers:

TABLE II

| | |
|---|---|
| Stress ($\sigma_1$) | 10 |
| Stress ($\sigma_2$) | 15 |
| Creep rate ($\dot{\epsilon}_1$) | $10^{-4}$ |
| Creep rate ($\dot{\epsilon}_2$) | $10^{-3}$ | then $$n = \frac{\log \epsilon_2 - \log \epsilon_1}{\log \sigma_2 - \log \sigma_1}$$

$$= \frac{\log (\epsilon_2/\epsilon_1)}{\log (\sigma_2/\sigma_1)}$$

$$= \frac{\log 10^{-3}/10^{-4}}{\log 15/10}$$

$$= \frac{1}{0.18} \cong 5.5$$

Generally, the time to rupture is closely related to the creep rate. Thus, on a stress vs. time to rupture curve, one may estimate the $n$ values as follows:

TABLE III $\sigma_1 = 7$; $t_1$ = time to rupture = $10^3$
$\sigma_2 = 5$; $t_2$ = time to rupture = $10^4$ $$n = \left| \frac{\log t_2 - \log t_1}{\log \sigma_2 - \log \sigma_1} \right|$$

$$= \left| \frac{\log (t_2/t_1)}{\log (\sigma_2/\sigma_1)} \right|$$

$$= \left| \frac{1}{-\log 7/5} \right| \cong 6.9$$

The absolute sign | | is used since stress-rupture curves usually have a negative slope.

Although the invention has been described with reference to specific embodiments, variations within the scope of the claims will be apparent to those skilled in the art.

What is claimed is:

1. A method for fabricating a metallic vessel comprising the steps of
    subjecting the vessel to an inside pressure $p_1$ which is greater than design pressure $p_2$ in the proportion $$p_1 = \frac{n}{n-1} p_2$$

$n$ being the creep exponent for the vessel material;
simultaneously heating the vessel to the temperature at which creep occurs;
holding said pressure and temperature until the vessel outside surface shows a constant creep rate; and
releasing the pressure and temperature.

2. A method according to claim 1 wherein said vessel is a solid wall vessel.

3. A method according to claim 1 wherein said vessel is a multi-layer vessel.

4. A method according to claim 1 wherein the design pressure $p_2$ is a function of vessel wall thickness and design stress $S_d$ in accordance with the following equation $$p_2 = \tfrac{1}{2} S_d (n)^{\frac{n}{n-1}} (R_i^{-2} - 1)^{\frac{-1}{n-1}} \left( R_i^{\left(\frac{-2}{n}\right)} - 1 \right)^{\frac{n}{n-1}}$$

wherein
$R_i$ = the ratio of vessel wall inside diameter to the outside diameter.

5. A method for fabricating a metallic pressure vessel comprising the steps of
    subjecting the vessel to pressure expansion at a temperature sufficiently high to obtain vessel creep;
    wherein the fabrication pressure $p_1$ equals $$\frac{n}{n-1} p_2$$

$p_2$ being the vessel design pressure, and $n$ being the creep exponent for the vessel material;
the design pressure $p_2$ being a function of the ratio of vessel wall inside diameter to outside diameter ($R_i$) and vessel design stress ($S_d$) in accordance with the equation $$p_2 = \tfrac{1}{2} S_d (n)^{\frac{n}{n-1}} (R_i^{-2} - 1)^{\frac{-1}{n-1}} (R_i^{-2/n} - 1)^{\frac{n}{n-1}}$$

holding said pressure and temperature until the vessel at the surface thereof shows a constant creep rate; and
releasing said pressure and temperature.

References Cited

UNITED STATES PATENTS

| | | | |
|---|---|---|---|
| 2,337,247 | 12/1943 | Kepler | 72—367 X |
| 2,372,723 | 4/1945 | Jasper | 29—446 |
| 3,064,344 | 11/1962 | Arne | 29—421 |
| 3,068,562 | 12/1962 | Long | 29—421 |
| 3,257,718 | 6/1966 | Krenzke | 29—404 |

THOMAS H. EAGER, *Primary Examiner.*

U.S. Cl. X.R.

29—421, 446; 72—367